(12) United States Patent
Misfeldt et al.

(10) Patent No.: US 9,374,497 B2
(45) Date of Patent: Jun. 21, 2016

(54) COMPONENT AND WATERMARK FORMED BY ADDITIVE MANUFACTURING

(71) Applicant: Caterpillar Inc., Peoria, IL (US)

(72) Inventors: Eric D. Misfeldt, Hopedale, IL (US); Mark T. Allott, Mapleton, IL (US); Stephen J. Pierz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 14/518,436

(22) Filed: Oct. 20, 2014

(65) Prior Publication Data

US 2016/0112601 A1    Apr. 21, 2016

(51) Int. Cl.
| | |
|---|---|
| B32B 3/10 | (2006.01) |
| B28B 1/16 | (2006.01) |
| B29C 67/00 | (2006.01) |
| H04N 1/32 | (2006.01) |
| B33Y 10/00 | (2015.01) |
| B33Y 70/00 | (2015.01) |
| B33Y 80/00 | (2015.01) |

(52) U.S. Cl.
CPC ............. *H04N 1/32325* (2013.01); *B28B 1/16* (2013.01); *B29C 67/0051* (2013.01); *B32B 3/10* (2013.01); *B33Y 10/00* (2014.12); *B33Y 70/00* (2014.12); *B33Y 80/00* (2014.12); *Y10T 428/24851* (2015.01); *Y10T 428/24868* (2015.01)

(58) Field of Classification Search
CPC .... B32B 3/10; B32B 1/16; Y10T 428/24851; Y10T 428/24868; B29C 67/0051
USPC .................................. 428/201, 203; 264/308
See application file for complete search history.

(56) References Cited

U.S. PATENT DOCUMENTS

| | | | |
|---|---|---|---|
| 6,456,726 B1 | 9/2002 | Yu et al. | |
| 6,823,075 B2 | 11/2004 | Perry | |
| 7,039,214 B2 | 5/2006 | Miller et al. | |
| 7,173,515 B2 | 2/2007 | Ohki et al. | |
| 7,366,301 B2 | 4/2008 | Huang et al. | |
| 8,345,316 B2 | 1/2013 | Bradley et al. | |
| 2014/0052287 A1 | 2/2014 | Swanson et al. | |
| 2014/0058959 A1 | 2/2014 | Isbjornssund et al. | |
| 2015/0170013 A1* | 6/2015 | Wilson ................. | G05B 19/188 235/468 |
| 2015/0375455 A1* | 12/2015 | Williams ............ | B29C 67/0088 700/119 |

* cited by examiner

*Primary Examiner* — Bruce H Hess
(74) *Attorney, Agent, or Firm* — Leydig, Voit & Mayer, Ltd.

(57) ABSTRACT

A method of forming a three-dimensional article includes sequentially forming a plurality of first two-dimensional layers and a second two-dimensional layer. The second two-dimensional layer includes a second outer edge and a second inner area within the boundary defined by the second outer edge. The second inner area includes uniform physical characteristic and a watermark area within the second inner area having a physical characteristic different from that of the second inner area. An article includes a body with an inner area having a physical characteristic. A watermark is within the inner area and has a physical characteristic different from the physical characteristic of the inner area.

13 Claims, 14 Drawing Sheets

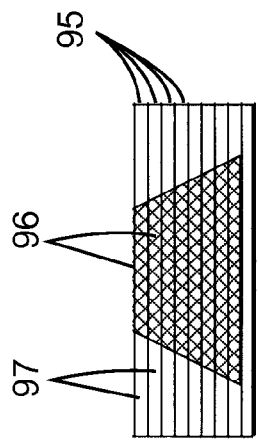
FIG. 17
FIG. 18
FIG. 19
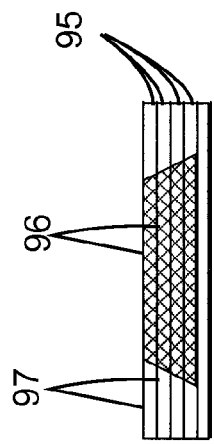
FIG. 20
FIG. 21
FIG. 22

COMPONENT AND WATERMARK FORMED BY ADDITIVE MANUFACTURING

TECHNICAL FIELD

This disclosure relates generally to a component formed by additive manufacturing and, more particularly, to an additive manufactured component including an internal watermark and a related method.

BACKGROUND

Additive manufacturing or three-dimensional printing is gaining momentum and moving beyond prototyping and towards use for manufacturing three-dimensional parts. The increase in popularity of additive manufacturing reduces the complexity of manufacturing replacement parts.

Users of industrial equipment and machines often may purchase replacement parts from an OEM or a dealer and expect the parts to be covered by warranty. Still further, genuine parts may be purchased from a third-party (e.g., are used parts) that are still covered by warranty. However, in some instances, a purchaser may acquire non-genuine products believing them to be genuine or, in some instances, knowing them not to be genuine.

If a failure of the equipment or machine occurs, the owner may look for compensation in terms of parts or services, or even liability, due to the failure of the equipment or machine based upon the failure of a replacement part. Before providing compensation, the manufacturer of the equipment or machine will likely want to confirm the authenticity of the parts that caused the failure of the equipment or machine. In some instances, manufacturers use coded information to identify manufacturing dates, locations, and other information so that they can authenticate genuine products. However, in some instances, unauthorized part manufacturers will copy the codes used by authorized part manufacturers in an attempt to pass-off their products as genuine.

As a result, manufacturers have developed further systems to reduce the likelihood that unauthorized products will be passed off as genuine products. For example, U.S. Pat. No. 7,173,515 discloses a system in which RFID tags may be attached to genuine articles or products in order to ensure their authenticity.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a method of forming a three-dimensional article includes sequentially forming a plurality of first two-dimensional layers with each first two-dimensional layer including a first outer edge defining a first boundary of the first two-dimensional layer and a first inner area within the boundary defined by the first outer edge. A second two-dimensional layer is formed adjacent one of the first two-dimensional layers, the second two-dimensional layer that includes a second outer edge defining a second boundary of the second two-dimensional layer and a second inner area within the boundary defined by the second outer edge. The second outer edge is aligned with the first outer edge of the adjacent one of the first two-dimensional layers. The second inner area has a physical characteristic and a watermark area within the second inner area has a physical characteristic different from the physical characteristic of the second inner area.

In another aspect, a method of forming a three-dimensional article includes forming a plurality of planar first two-dimensional layers with each planar first two-dimensional layer having a first outer edge defining a boundary of the planar first two-dimensional layer and a first inner area within the boundary defined by the first outer edge. At least one planar second two-dimensional layer is formed between two of the plurality of first two-dimensional layers with each at least one planar second two-dimensional layer having a second outer edge defining a boundary of the planar second two-dimensional layer. A second inner area within the boundary is defined by the second outer edge and the second inner area has a generally uniform physical characteristic. While the at least one planar second two-dimensional layer is formed, a watermark area is formed within the second inner area. The watermark area has a physical characteristic different from the generally uniform characteristic of the first inner area to define at least a portion of a watermark.

In still another aspect, an article includes a body having an outer surface and an inner area with the inner area having a physical characteristic. A watermark is located within and surrounded by the inner area. The watermark has a physical characteristic different from the physical characteristic of the first area.

BRIEF DESCRIPTION OF THE DRAWINGS

FIGS. 17-22 depict a diagrammatic sequence of the formation of a portion of the watermark of FIG. 15.

DETAILED DESCRIPTION

Additive manufacturing systems may be used to manufacture three-dimensional articles or parts from digital representations or files using one or more additive manufacturing techniques. A plurality of additive manufacturing processes exist including stereolithography, laser sintering or melting, extrusion techniques, material jetting (e.g., using an inkjet), selective deposition or lamination, and electron beam melting. Other techniques are possible and are expected to be developed in the future.

Additive manufacturing may be used with a wide range of materials. These materials may include resins or plastics, metals, ceramics, glass, and any other material. The manufacturing process may begin with the materials in any form including liquid, powder or other types of solids as well as films.

Figure 1:
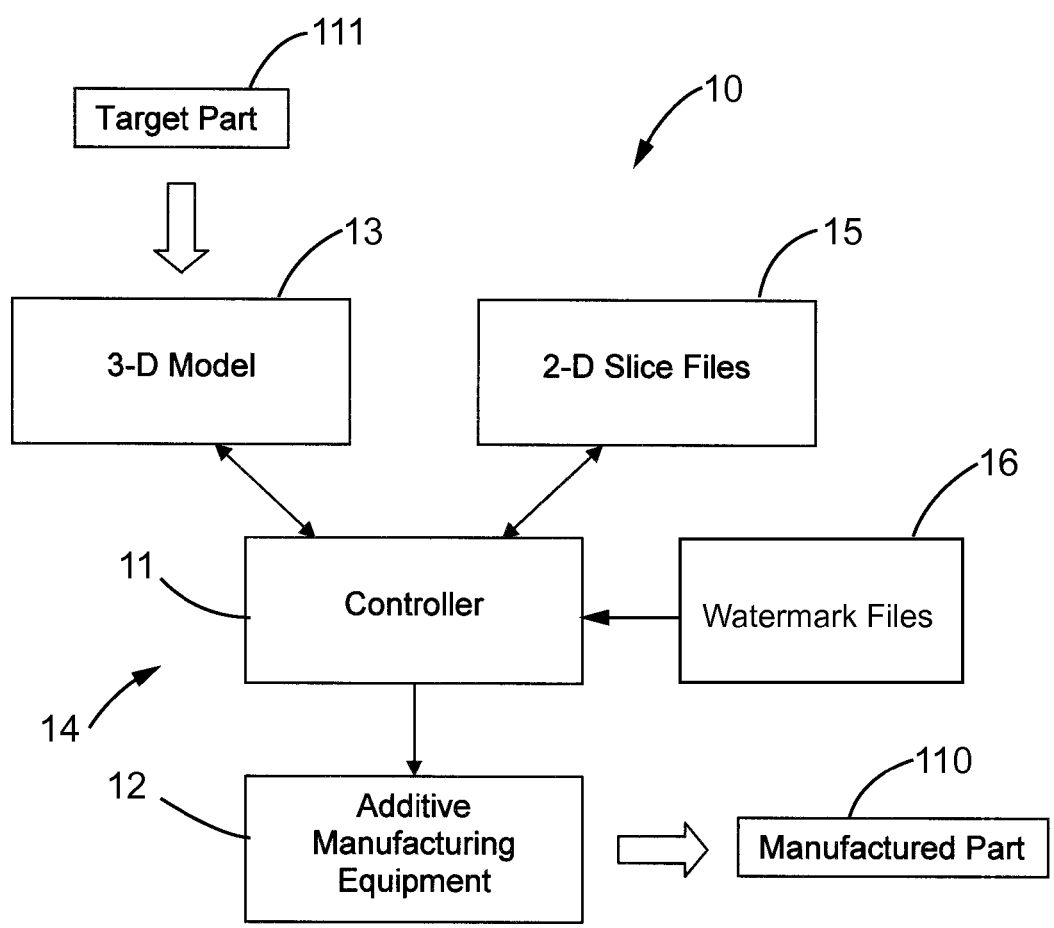
FIG. 1 depicts a diagrammatic illustration of a system for additive manufacturing of parts in accordance with the disclosure.
Figure 2:
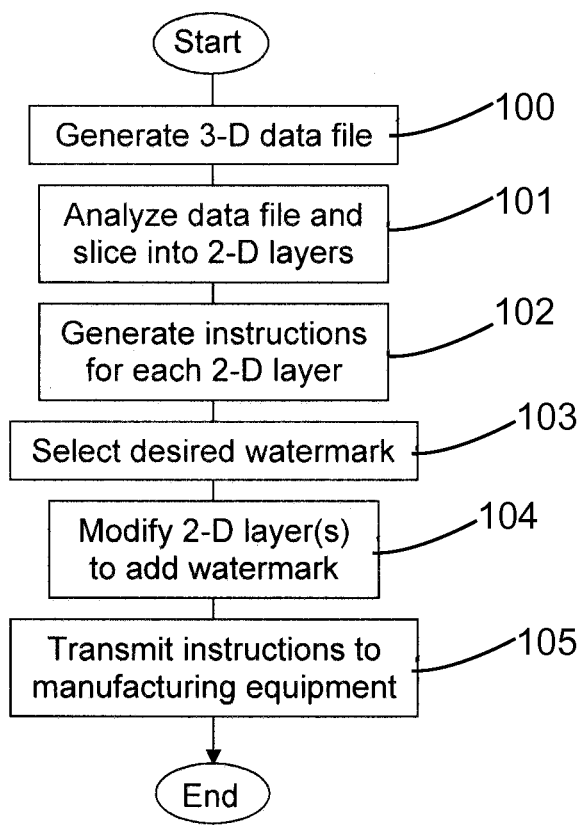
FIG. 2 depicts a flowchart illustrating a process for additive manufacturing of parts in accordance with the disclosure.

Regardless of the process and the materials used, the additive manufacturing process is generally similar. Referring to FIG. 1, an exemplary system 10 for additive manufacturing is depicted. System 10 includes a controller 11 operatively connected to additive manufacturing equipment 12 that, in combination, operate to manufacture the desired parts 110. To do so, referring to FIG. 2, a data file or three-dimensional model 13 of a target part 111 is generated or created. In some instances, a designer may create the three-dimensional model 13 while designing the part or component such as by using a CAD system. In other instances, an existing part may be placed in a scanner that scans the three-dimensional part in an automated manner to generate the three-dimensional model 13.

Controller 11 may include a planning system generally indicated at 14 that is operative to analyze the three-dimensional model 13 at stage 101 and electronically slice the model into a plurality of parallel layers. The parallel layers define the layers of material that will be generated or produced during the manufacturing process. Inasmuch as the slices or layers may be as thin as 0.02 mm thick, the slices are referred to herein as two-dimensional layers that are sequentially formed one on top of (or below) another to generate the three-dimensional manufactured part 110.

The planning system 14 may further generate at stage 102 instructions or files 15 of the two-dimensional layers for manufacturing each two-dimensional layer of the three-dimensional part. In doing so, the planning system 14 may divide each two-dimensional layer into a plurality of small areas to define a two-dimensional array of elements. The planning system 14 may then analyze each element or location of the two-dimensional array and determine one or more desired physical characteristics or properties for that element. Although the part may be formed of a single material, the physical characteristics of the elements that form the part may vary, even in a single two-dimensional layer. In one example, the physical characteristic may be the density or level of fill of the material. In another example, the physical characteristic that varies may be the hardness, crystallinity, or strength, or any other property or characteristic.

In some instances, elements that define or are part of an outer surface or outer area of the three-dimensional part may have one physical characteristic while other elements such as those that are part of an inner area of the part and spaced from the outer surface may have a different physical characteristic. Still further, elements that are part of the inner area but have a structural function may have either a third physical characteristic or one that matches that of the outer area.

In an embodiment in which the physical characteristic is density, the planning system 14 may change the density of elements within a two-dimensional layer by changing the pattern that forms the two-dimensional layer. For example, in some instances, all or portions of a two-dimensional layer may be formed with a solid pattern and thus include no voids or relatively small voids along the layer. In other instances, portions or areas of the two-dimensional layer may be formed with a specific pattern having a predetermined shape and a desired strength. For example, portions of a two-dimensional layer may be formed with a generally rectangular grid with a desired spacing between the lines to create square or rectangular openings of a desired size. In other instances, portions of a two-dimensional layer may have a uniform grid with openings of other shapes. Such openings may be configured in any desired manner including circles, hexagons, diamonds, or other desired shapes. The strength and weight of each two-dimensional layer and thus the part overall may be established based upon the size and shape of the openings.

In an embodiment in which the physical characteristic is hardness, crystallinity, or strength, the planning system 14 may be configured to alter the manufacturing process to change the characteristics. For example, when using metal to form the manufactured parts 110, a different amount of heat may be applied during the manufacturing process to change the metallurgical properties (e.g., hardness, crystallinity, strength) of the material used to form the part. In one example, a different amount of heat (e.g., magnitude and/or duration) may be applied to the elements along the outer edge or boundary of each two-dimensional layer as compared to the inner area to make the material harder along the outer surface and more ductile along the interior or inner area of the manufactured parts.

As part of the analysis of the elements at stage 102, the planning system 14 may be configured to ensure that the desired performance characteristics of the overall part are met while optimizing other aspects of the part. For example, when reducing the density of material at elements of the two-dimensional layer, the planning system may analyze the configuration of a plurality of layers to ensure that the strength and other characteristics are not compromised. An advantage of reducing the density in such a manner is a reduction in weight and the amount of material used to manufacture the product. This may also increase the speed of the manufacturing process.

As described in more detail below, the planning system 14 may be configured to add a watermark 16 to the manufactured part 110 by adding a watermark or a portion of a watermark to one or more of the two-dimensional layers used to form the manufactured part. To do so, the planning system 14 or an operator may select or input a desired watermark 16 at stage 103. The planning system 14 or the operator may then determine the location of the watermark 16 and the planning system may modify at stage 104 the slice files for the necessary two-dimensional layers so that the manufactured part 110 will be generated with the desired watermark.

Once the configuration for each of the two-dimensional layers has been established, instructions may be transmitted at stage 105 to the additive manufacturing equipment 12 at which the two-dimensional layers may be sequentially formed to produce the manufactured part 110, including the watermark 16. Stage 105 may be repeated until the desired number of manufactured parts 110 have been produced.

As used herein, a watermark may be any type of marker or identifier that is used to convey information for any desired purpose. A watermark may be one or more characters or shapes that may be as simple as a circle or a triangle, or as complex as a sequence of letters, numbers, and other characters or symbols that define a unique identifier or code.

In use, a watermark may be used to verify the authenticity of a part or component. In another example, the watermark may be used to convey information as to the details regarding the manufacture of the component. In still another example, a watermark may be used to determine the identity of the source of a three-dimensional data file used to manufacture the component.

Figure 3:
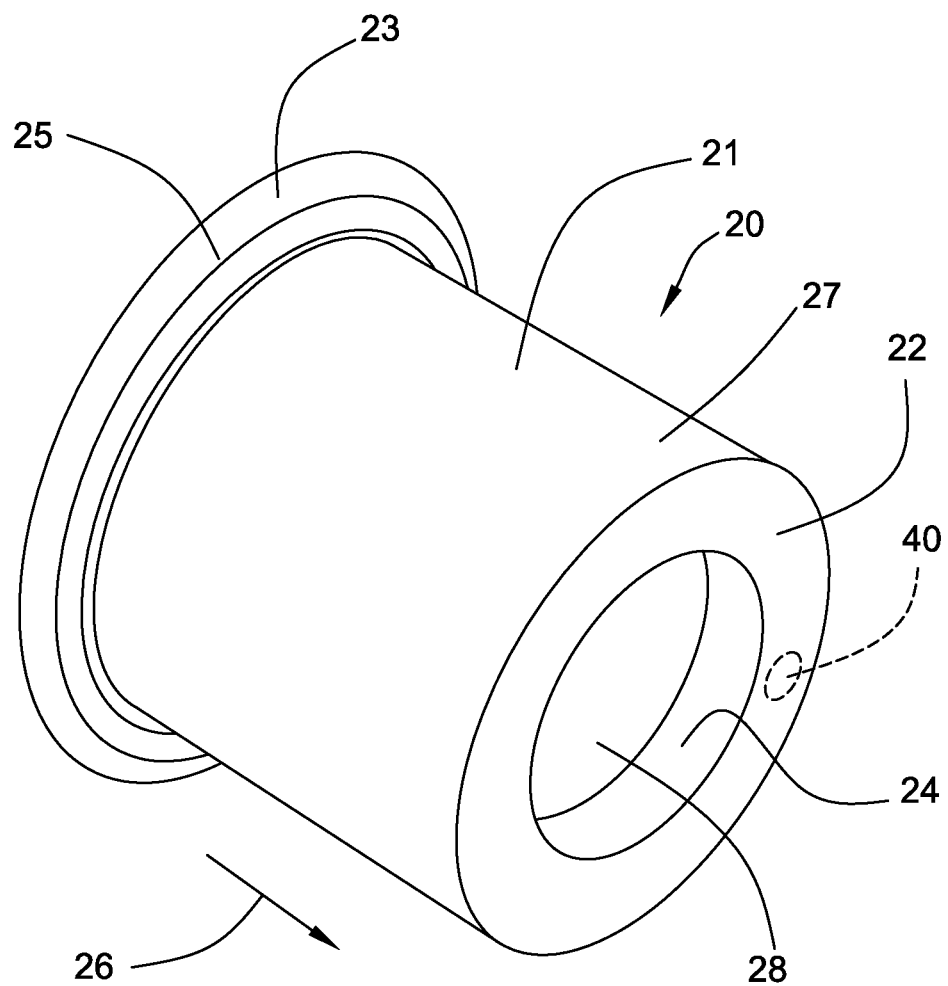
FIG. 3 depicts an exemplary part created by additive manufacturing in accordance with the disclosure.

Referring to FIG. 3, an exemplary part or component manufactured by an additive process and including a watermark 40 is depicted. The component is configured as a cylindrical bushing 20 although it may be any three-dimensional part. The bushing 20 has a cylindrical main body 21 with a first end 22 and a second end 23. The first end 22 has a circular bore 24 and the second end 23 has an annular flange 25. For purposes of this description, the bushing 20 may be formed from a plurality of two-dimensional layers in either direction from first end 22 to second end 23, such as in the direction of arrow 26.

Figure 4:
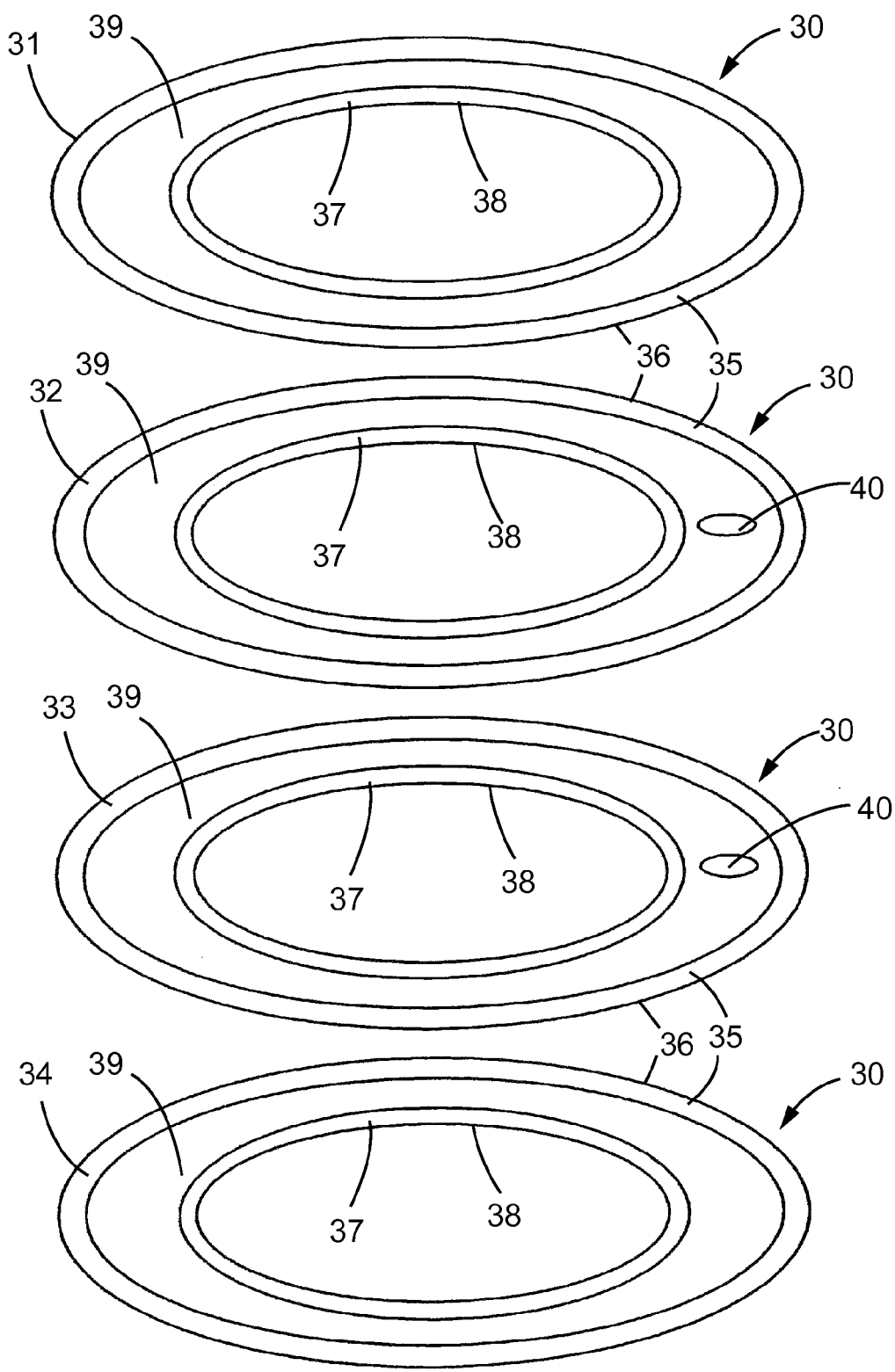
FIG. 4 depicts a plurality of two-dimensional layers used with the additive manufacturing of the part depicted in FIG. 3.

Four of the plurality of two-dimensional layers 30 that form bushing 20 are depicted in FIG. 4 as 31-34. Each of the two-dimensional layers 30 has a first outer area 35 adjacent the outer edge 36 and a second outer area 37 adjacent the inner surface 38. Upon combining or forming a stack of a plurality of two-dimensional layers 30, the outer edges 36 in combination form or define the outer surface 27 of bushing 20 and inner surfaces 38 in combination form or define the inner surface 28 of the bushing.

The first outer area 35 and the second outer area 37 of each two-dimensional layer 30 of bushing 20 may be manufactured to have a generally uniform physical characteristic such as a relatively high density or may be solid. The inner area 39 of each two-dimensional layer 30 between the first outer area 35 and the second outer area 37 may be configured with a different generally uniform physical characteristic such as a lower density provided that desired operational characteristics such as strength and durability are met. In other words, the first outer area 35 and the second outer area 37 may have a first generally uniform physical characteristic (e.g., density) and the inner area 39 may have a second generally uniform physical characteristic (e.g., density).

In an exemplary embodiment, the second layer 32 and the third layer 33 may be identical to the first layer 31 and the fourth layer 34 but each may also include a watermark area having a watermark 40 with different characteristics from the adjacent portion or area of the layer. By embedding the layers with the watermark (i.e., second layer 32 and third layer 33) within layers not having the watermark (i.e., first layer 31 and fourth layer 34) and with the boundaries of the inner area 39, the watermark 40 itself is hidden within the structure of the manufactured part 110 and is not readily observable. By making it difficult to detect, it is thereby more difficult to replicate by someone attempting to copy the part and pass it off as a genuine product.

Figure 5:
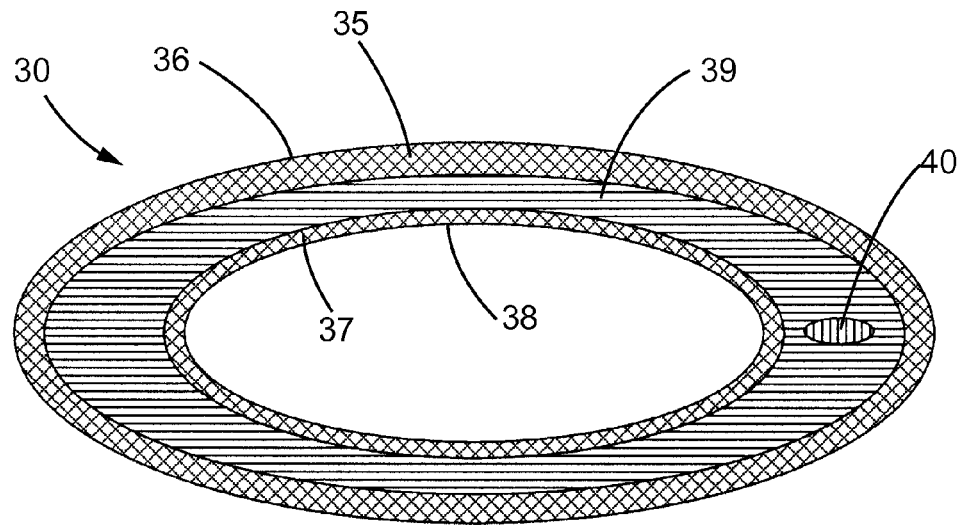
FIG. 5 depicts an enlarged view of an embodiment of one of the two-dimensional layers of FIG. 4.

FIGS. 5-9 depict different embodiments of a two-dimensional layer 30 including watermark 40 (such as second layer 32). In FIG. 5, the first outer area 35 and the second outer area 37 have a first density and the entire inner area 39 of the two-dimensional layer 30 including the watermark 40 has a second density. However, the majority of the inner area 39 has a first pattern (e.g., a linear pattern) in a first direction and the watermark 40 has the same pattern but oriented in a different direction. For example, the pattern of the watermark 40 may be perpendicular to the pattern of the majority of the inner area 39.

Figure 6:
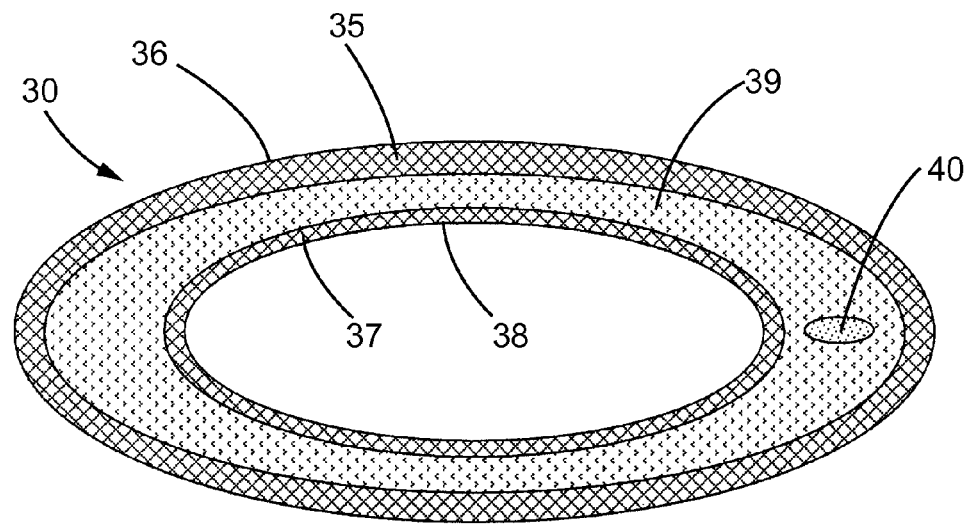
FIG. 6 depicts an alternate embodiment of the two-dimensional layer of FIG. 5.
Figure 7:
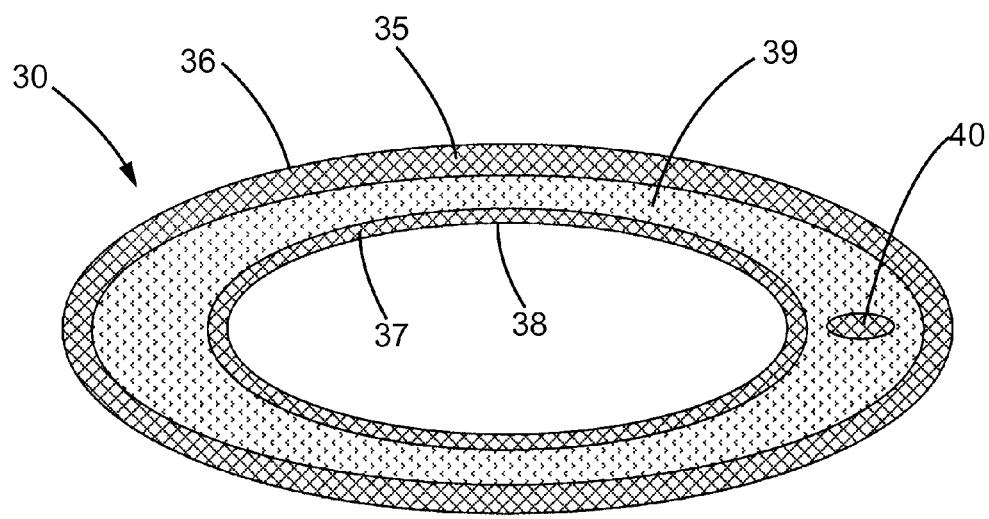
FIG. 7 depicts another alternate embodiment of the two-dimensional layer of FIG. 5.
Figure 8:
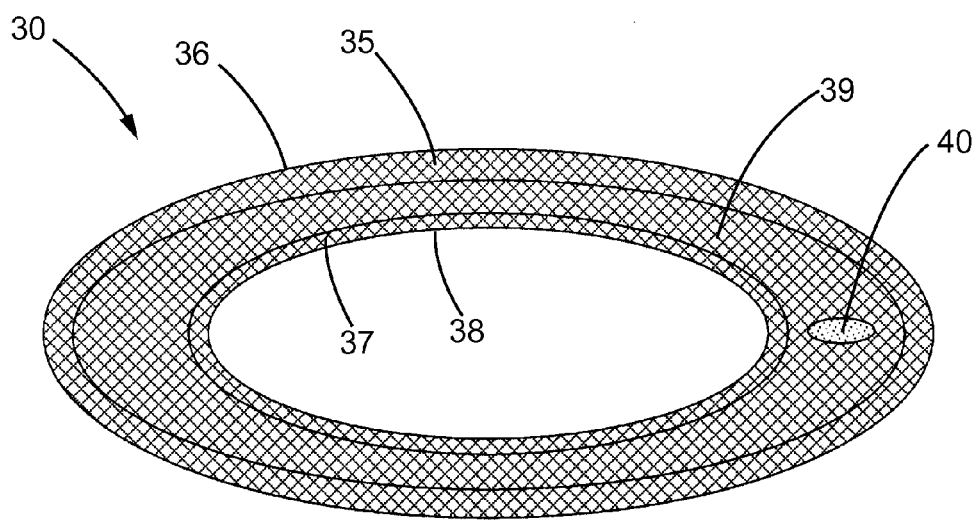
FIG. 8 depicts still another alternate embodiment of the two-dimensional layer of FIG. 5.

In the additional embodiments depicted in FIGS. 6-8, the first outer area 35 and the second outer area 37 have a first density and the majority of the inner area 39 has a second density and the watermark 40 may have a density different from the second density (i.e., either a third density or a density that matches the first density). The different densities are depicted with different patterns in the drawing for clarity. In the embodiment of FIG. 6, the first outer area 35 and the second outer area 37 may have a 100% fill rate, the inner area 39 may have a 70% fill rate, and the watermark may have a 30% fill rate. In the embodiment of FIG. 7, the first outer area 35 and the second outer area 37 may have a 100% fill rate, the inner area 39 may have a 70% fill rate, and the watermark may have a 100% fill rate. In the embodiment of FIG. 8, the first outer area 35, the second outer area 37, and the inner area 39 may have the same density such as a 100% fill rate and the watermark 40 may have a lower density such as a 30% fill rate.

In some instances, different fill rates may be achieved by utilizing different patterns (e.g., a lattice having different shaped openings such as circular, hexagonal, rectangular, diamond, or any other desired shape) or by using a uniform pattern but changing the size of openings in the two-dimensional layer 30.

Figure 9:
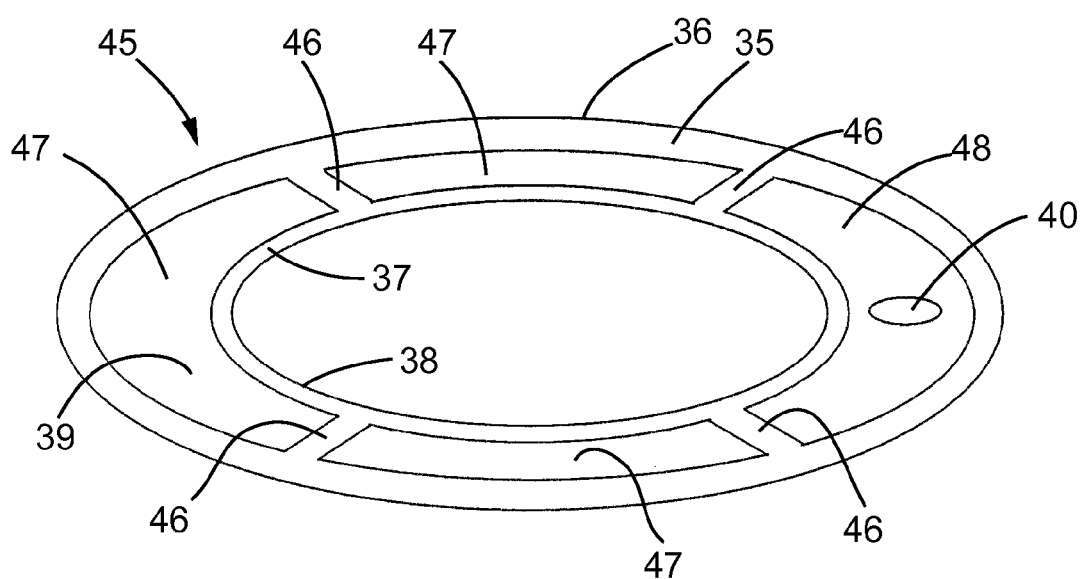
FIG. 9 depicts a further alternate embodiment of the two-dimensional layer of FIG. 5.

FIG. 9 depicts an alternate embodiment of a two-dimensional layer 45. Two-dimensional layer 45 may be identical to two-dimensional layer 30 except that it includes support members 46 that extend between and connect the first outer area 35 and the second outer area 37. The support members 46 may have a density greater than that of the inner area 39 and may increase the strength of the bushing 20. With this configuration, the inner area 39 may be divided into a plurality of distinct areas 47. A first area 48 of the distinct areas 47 may have a density (or any other physical characteristic) different from that of the watermark 40.

As depicted in FIG. 4, the watermarks 40 of the second layer 32 and third layer 33 are vertically aligned to form a watermark that extends or has a depth greater than one two-dimensional layer 30 of the bushing 20. The watermark 40 may extend or span as many two-dimensional layers 30 as desired and the number of layers may depend to some extent on the thickness of each layer. In some instances, it may be desirable to minimize the number of two-dimensional layers 30 including the watermark 40. In one example, the number of two-dimensional layers 30 including the watermark 40 may be minimized to increase the difficulty for a non-authorized manufacturer to locate and thus duplicate the watermark in non-genuine components.

In some instances, the shape or size of a component being manufactured may create challenges in generating a watermark that extends parallel to the direction of the plurality of two-dimensional layers. In other instances, strength requirements or other desired characteristics of the component may create challenges for a watermark having such a parallel configuration. Accordingly, in another embodiment a watermark may be oriented so that it extends generally perpendicular to the two-dimensional layers used to form a component.

Figure 10:
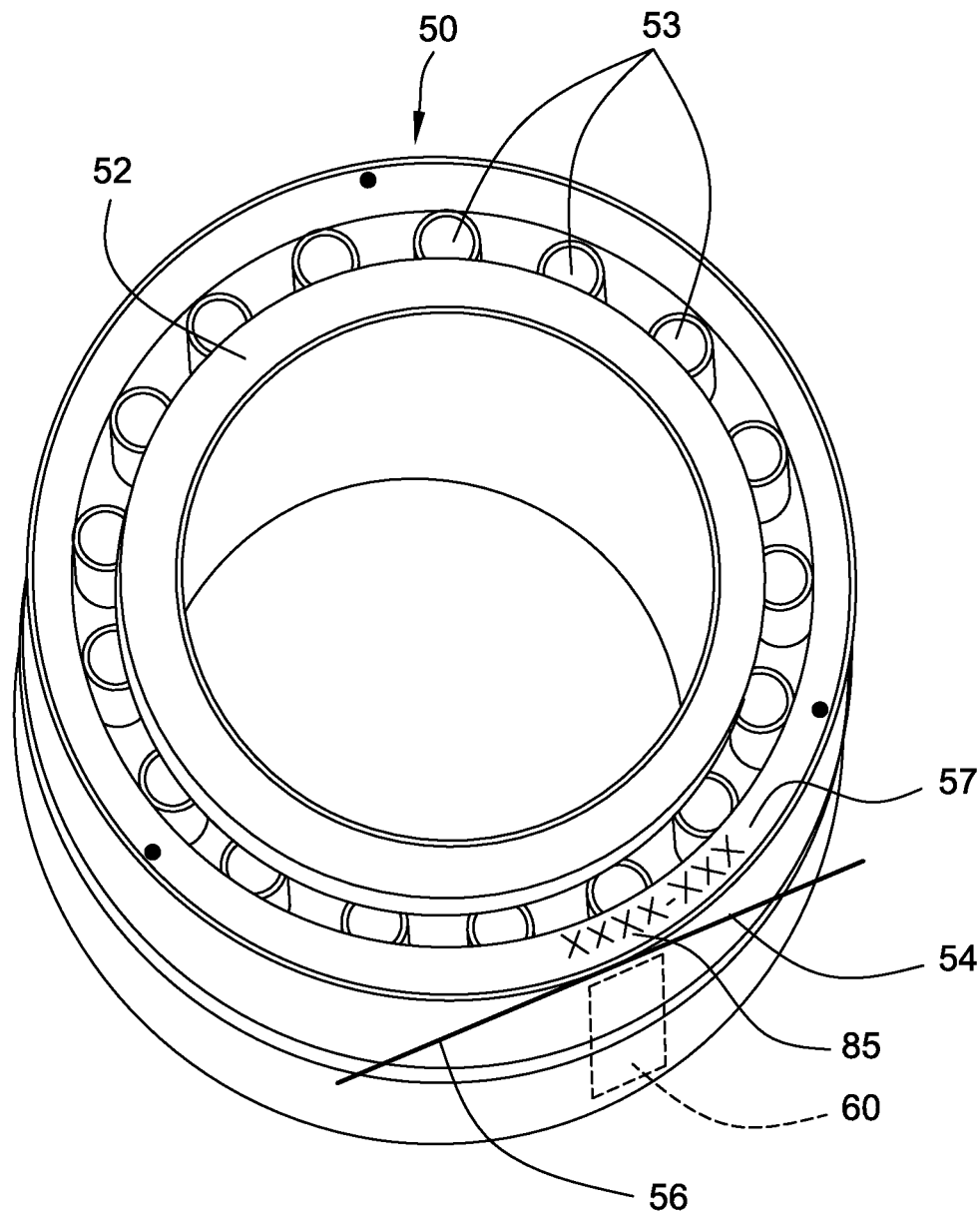
FIG. 10 depicts an exemplary assembly created by additive manufacturing in accordance with the disclosure.

Referring to FIG. 10, another example of a component manufactured by an additive process and including a watermark 60 is depicted. A bearing assembly 50 includes a body or outer race 51, an inner race 52, and a plurality of rollers 53 between the body and the inner race. As may be seen in the partial cross-section depicted in FIG. 16, the components of the bearing assembly are relatively narrow in a horizontal direction (i.e., in a direction parallel to the cross-section). As a result, it may be relatively difficult to create a watermark that fits within the plane of a two-dimensional layer from which the components are formed.

Figure 11:
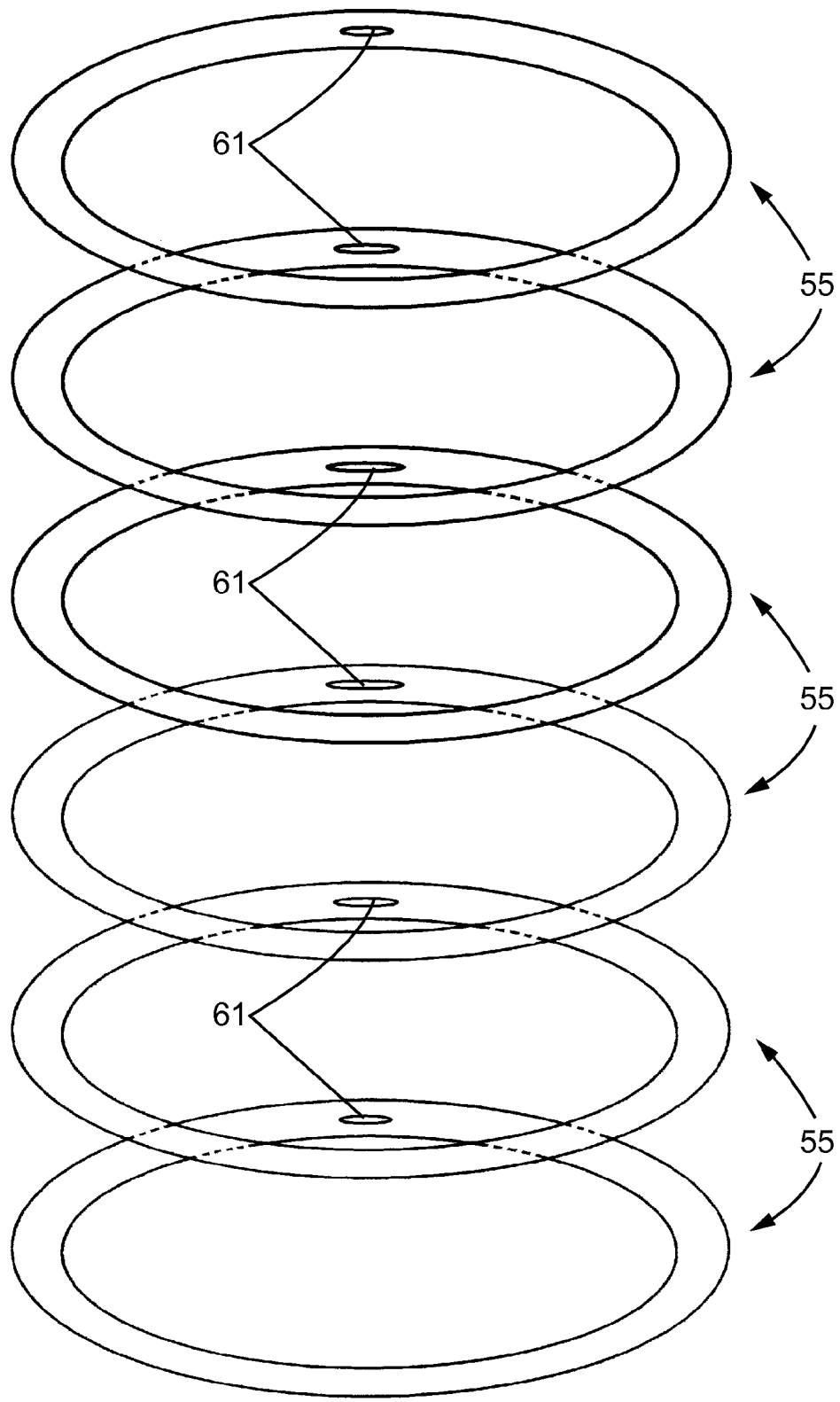
FIG. 11 depicts a plurality of two-dimensional layers used with the additive manufacturing of a portion of the assembly of FIG. 10.
Figure 12:
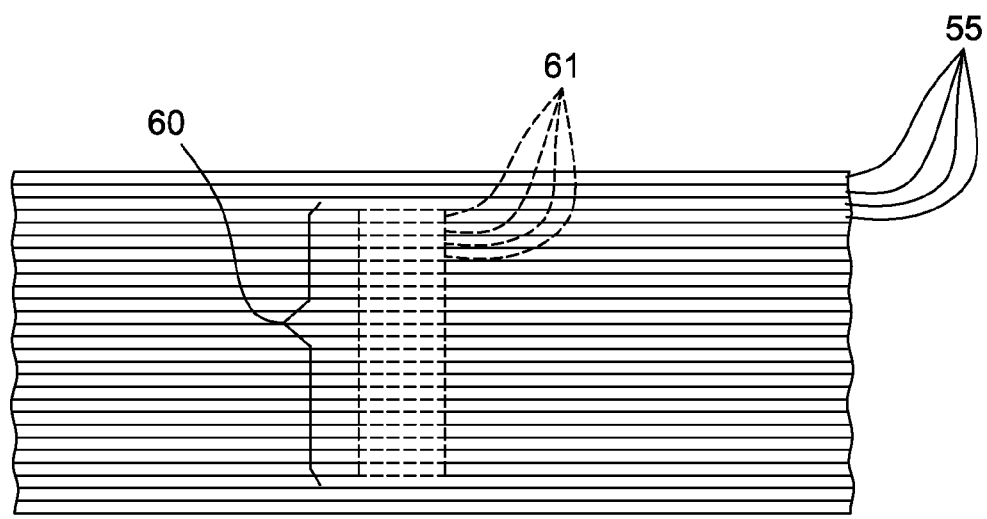
FIG. 12 depicts a diagrammatic cross-section of a portion of the two-dimensional layers used with the additive manufacturing of a portion of the assembly of FIG. 10 to form the watermark.

Although the bearing assembly 50 is formed from a plurality of two-dimensional layers 55, only six two-dimensional layers of the outer race 51 are depicted as in FIG. 11. Each two-dimensional layer 55 of outer race 51 may have generally constant or consistent characteristics or properties. A relatively small portion or watermark section 61 of a watermark 60 within outer race 51 may be formed in some of the adjacent two-dimensional layers 55 with the portion of the watermark having one or more characteristics that are different from the rest of the two-dimensional layer. More specifically, the watermark 60 may be generated by forming a plurality of stacked two-dimensional layers 55 with each layer having a generally aligned watermark area or watermark section 61 as depicted in FIG. 12. As each two-dimensional layer 55 is generated, an additional watermark section 61 of the watermark 60 is formed until the entire composite of the watermark is formed and extends through a plurality of two-dimensional layers.

As depicted in FIG. 12, additional two-dimensional layers 55 without the watermark section 61 may be included both above and below those layers having the watermark sections as desired in order to form the bearing assembly 50.

The watermark sections 61 may have one or more physical characteristics that are different from other portions of the two-dimensional layers 55. In one example, as described above, the density of the watermark section 61 may be different from that of the surrounding area. In another example, the crystalline structure of the material used to form the watermark sections 61 may be different from that of the rest of the two-dimensional layer 55. This may be achieved by controlling the manufacturing process such as by changing the magnitude or duration of a heat or energy source used to create each two-dimensional layer 55. Other manners of altering or controlling the physical characteristics of the watermark sections 61 are contemplated.

With the described configuration, a plurality of the two-dimensional layers 55 may have a segment or watermark section 61 that, in combination with the other watermark sections, form the watermark 60. Each of the watermark sections 61 is within the plane of the two-dimensional layer 55 and is thus perpendicular to the plane of the watermark 60 as best seen in FIG. 12.

Through such a structure, a relatively large number of two-dimensional layers 55 that each include a watermark section 61 are combined or necessary to generate the watermark 60. For example, if the desired height of the watermark is 2.0 mm and each two-dimensional layer 55 is 0.05 mm thick, forty two-dimensional layers would be required to generate or form the watermark 60. Still further, in order to generate the watermark 90 depicted in FIG. 15, an even greater number of two-dimensional layers 55 would be required.

Referring back to FIGS. 3-9, watermark 40 is generally planar and the plane of the watermark is generally parallel to the plane of each two-dimensional layer 30. In contrast, in FIGS. 10-12, the watermark 60 is generally planar and the plane is generally perpendicular to the plane of the two-dimensional layers 55. The watermark 60 is formed by a plurality of watermark sections 61 that are generally perpendicular to the plane of the watermark.

The watermarks within a part or component may be oriented in any desired manner. For example, as depicted in FIGS. 10-12, the plane of the watermark 60 may be oriented generally parallel to a line 56 tangent to the outer surface 54 of outer race 51. In another example depicted in FIG. 15, the watermark may be oriented at an angle to the tangent line 56.

Figure 13:
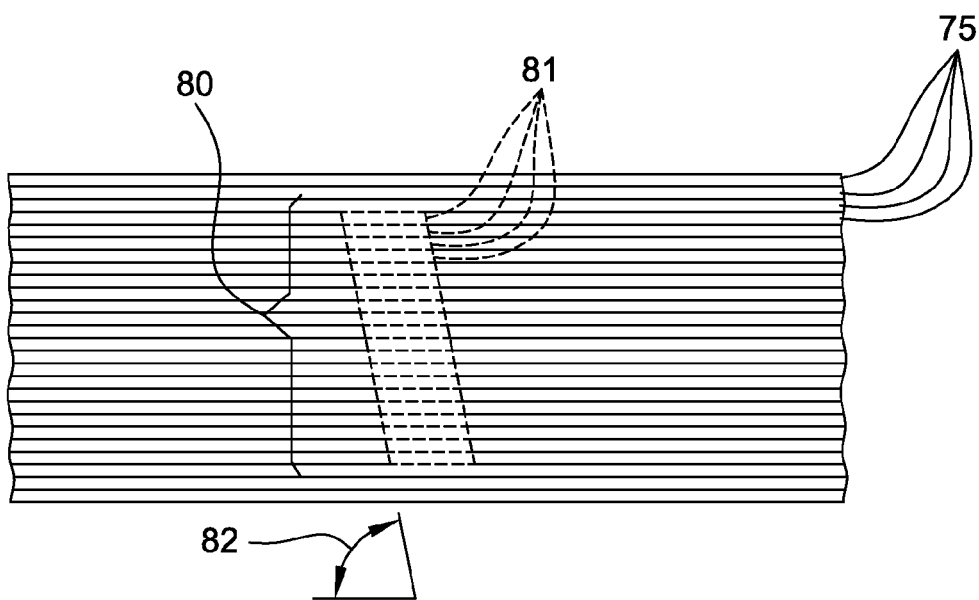
FIG. 13 depicts a diagrammatic cross-section similar to FIG. 12 but with each watermark section offset from those of adjacent two-dimensional layers.

Still further, although described in the context of the watermarks being generally parallel (FIG. 3-9) or perpendicular (FIGS. 10-12) to the two-dimensional layers, the watermarks may also be formed at an angle to the two-dimensional layers. Referring to FIG. 13, the watermark section 81 of a portion of adjacent two-dimensional layers 75 that form a watermark 80 may be offset relative to the plane of the two-dimensional layers. More specifically, a plurality of two-dimensional layers 75 are depicted with each having a watermark section 81. Each watermark section 81 is laterally offset relative to the watermark sections within the adjacent two-dimensional layers 75. As a result, the entire watermark 80 is at an angle 82 relative to the plane of each of the two-dimensional layers.

The watermarks may be positioned at any desired location within a component. Referring to FIG. 10, a part number 85 is depicted on a surface 57 at one end of the outer race 51. In one example, watermark 60 may be positioned beneath the part number 85 thereby providing a visual indicator on the surface of the part as to where the watermark should be located. The watermark 60 could be exposed by machining the outer surface 54 of outer race 51 beneath the part number 85. In another example, it may be possible to utilize non-destructive techniques to locate the watermark 60. For example, a system (not shown) may be provided to identify or determine a change in characteristics within the outer race 51. A system may be provided to monitor or read changes in the density or crystallinity within the outer race 51 without having to remove the overlying material.

In another example, a location code or identifier may be provided that identifies the location of the watermark within the part. In some embodiments, the watermarks may be relatively thin and positioned at an unknown angle. Accordingly, it may be difficult to determine the exact location of a watermark absent a location code.

Figure 14:
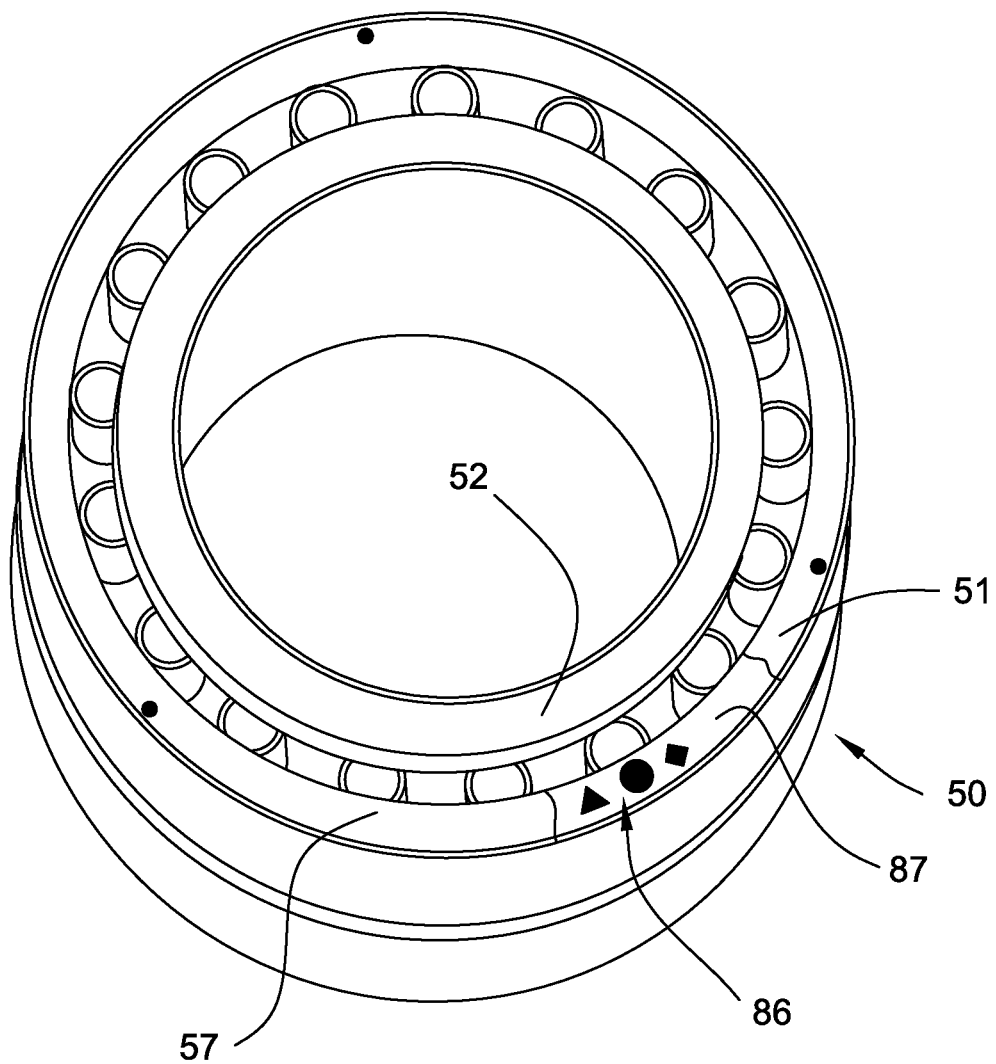
FIG. 14 depicts the assembly of FIG. 10 but with a portion removed to reveal a location code.

Referring to FIG. 14, bearing assembly 50 is depicted with a portion of the outer race 51 beneath the part number 85 (FIG. 10) removed at 87 to reveal a location code 86. The location code 86 may specify or be indicative of the location of a watermark including its orientation, depth or distance below or from a surface, as well as the angular orientation from a reference point. For example, the triangle, circle, and diamond depicted in the location code 86 of FIG. 14 may correspond to a predetermined orientation, depth from a surface, and angular orientation, respectively. In one example, the reference point might be the part number 85, a portion of the location code 86, or any other designated reference.

Figure 15:
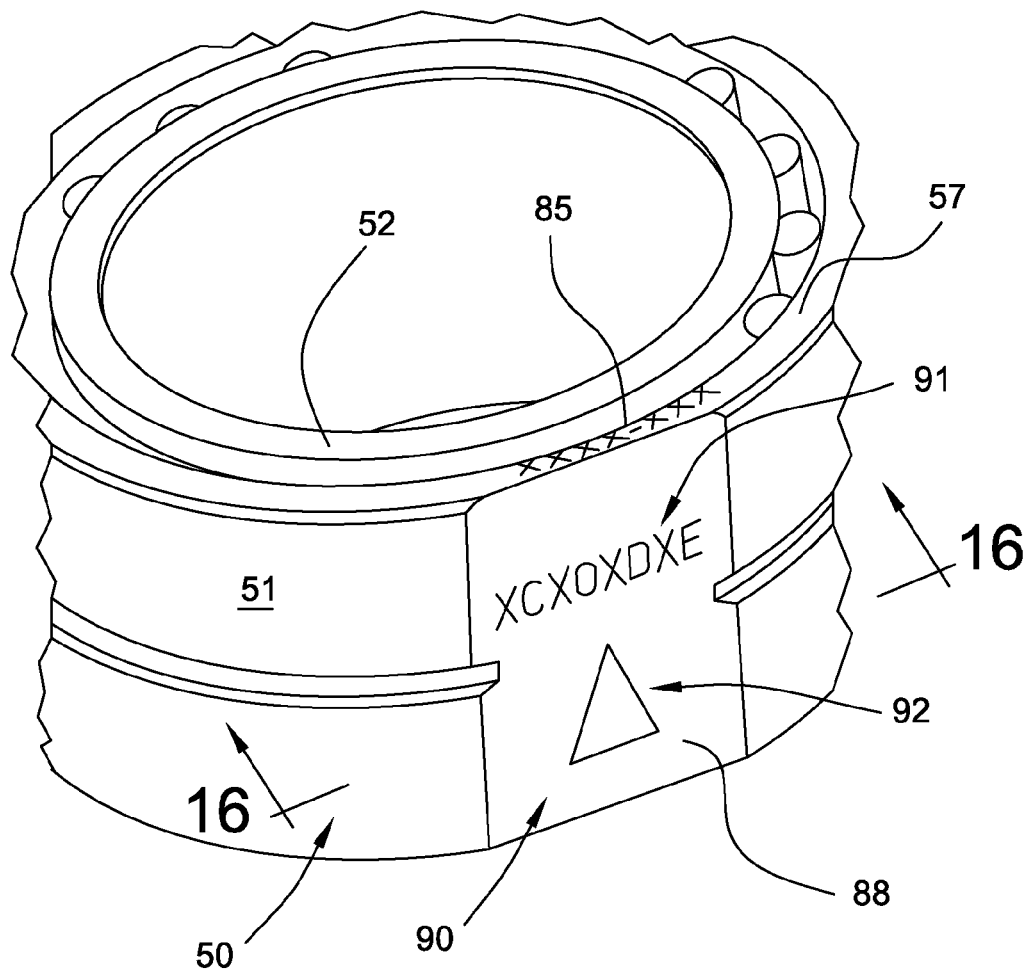
FIG. 15 depicts an assembly similar to that of FIG. 10 but with the watermark in a different location and a portion removed to reveal the watermark within the outer race.

Referring to FIG. 15, a portion of the outer surface 54 of the outer race 51 is removed at 88 to reveal a watermark 90. As depicted, the watermark 90 includes an alphanumeric code 91 and a symbol depicted as a triangle 92. It should be noted that the watermark 90 is positioned beneath the part number 85 but at an angle to a line 56 (FIG. 10) tangent to the outer surface 54 of the outer race 51.

Figure 16:
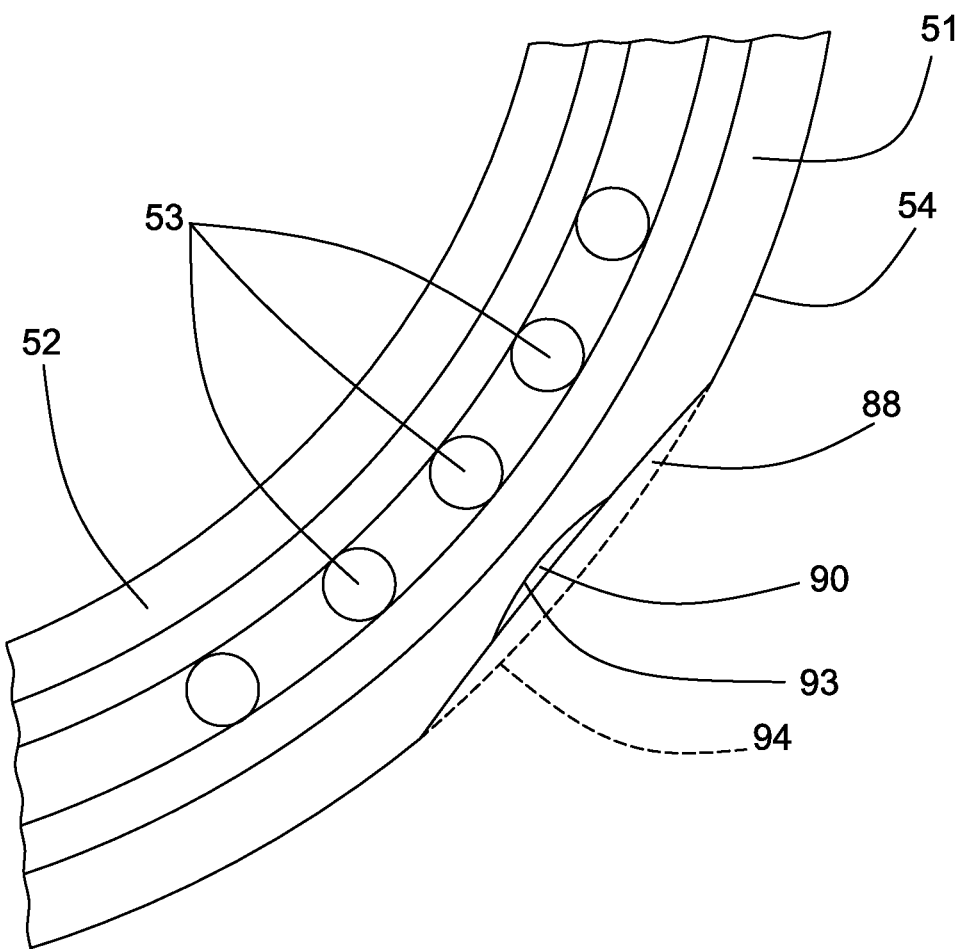
FIG. 16 depicts a partial cross-section of the assembly of FIG. 15 taken generally along line 16-16 with certain parts removed.

FIG. 16 depicts a partial cross-section taken generally along line 16-16 in FIG. 15. The section through the triangle 92 of watermark 90 is depicted at 93. In addition, the outer surface 54 of the outer race 51 that has been removed by machining is depicted in dashed lines at 94.

FIGS. 17-22 depict a sequence of the formation of a watermark such as triangle 92 of FIG. 15 that is perpendicular to the plane of the two-dimensional layers 95. The watermark section 96 of each two-dimensional layer 95 may have a first characteristic while the area 97 surrounding the watermark section has a second characteristic to differentiate the two areas. The entire two-dimensional layer 95 above and below those that include watermark sections 92 may also match the second characteristic. It should be noted that drawings omit some of the sequence of the formation of the two-dimensional layers 95 as each layer is formed individually.

INDUSTRIAL APPLICABILITY

The industrial applicability of the system described herein will be readily appreciated from the foregoing discussion. The present disclosure is applicable parts or components that are formed using an additive process. Watermarks may be used to verify the authenticity of a part or component and/or convey details regarding its manufacture or the version of the part. In some instances, the inclusion of a watermark may not necessarily prove that a part is genuine but the absence of the necessary watermark may be highly probative as to the part's authenticity. In addition, the watermark may include coding or other information that may be used to determine when and where the part was manufactured. Further, the watermark may also be used to determine the version or revision number of a part. In some instances, this may be accomplished without an alphanumeric code but may be based upon shape or size of a symbol that forms all or part of the watermark.

In addition, a watermark may be used to determine the identity of the source of a three-dimensional data file or the two-dimensional slice files used to manufacture the component. More specifically, authorized manufacturers of a product may be provided with data files that are used to manufacture the component using an additive manufacturing process. By providing a unique watermark to each authorized manufacturer, analysis or inspection of the watermark of a component will reveal the origin of the data file used to manufacture the component. In some instances, this information may be used to determine the manufacturer of a specific component. In other instances, the watermark may be used to track or identify the source of unauthorized copies of the data file.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of forming a three-dimensional article comprising:
sequentially forming a plurality of first two-dimensional layers, each first two-dimensional layer including a first outer edge defining a first boundary of the first two-dimensional layer and a first inner area within the first boundary defined by the first outer edge;
forming a second two-dimensional layer adjacent one of the plurality of first two-dimensional layers, the second two-dimensional layer including a second outer edge defining a second boundary of the second two-dimensional layer and a second inner area within the second boundary defined by the second outer edge, the second outer edge being aligned with the first outer edge of the adjacent one of the plurality of first two-dimensional layers, the second inner area having a physical characteristic and a watermark area within the second inner area having a physical characteristic different from the physical characteristic of the second inner area.

2. The method of claim 1, wherein the watermark area of the second two-dimensional layer defines at least a portion of a generally planar watermark, a plane of the generally planar watermark being generally parallel to a plane of the second two-dimensional layer.

3. The method of claim 1, further including sequentially forming a plurality of adjacent second two-dimensional layers.

4. The method of claim 3, wherein the watermark area of each of the plurality of adjacent second two-dimensional layers defines a watermark section, and the watermark section of each of the plurality of adjacent second two-dimensional layers in combination define a generally planar watermark, a plane of the generally planar watermark being generally perpendicular to planes of the plurality of adjacent second two-dimensional layers.

5. The method of claim 1, wherein the plurality of first two-dimensional layers and the second two-dimensional layer are formed of a single material.

6. The method of claim 1, wherein the first inner area of each first two-dimensional layer has a physical characteristic, and the physical characteristic of the first inner area of each first two-dimensional layer matches the physical characteristic of the second inner area of the second two-dimensional layer.

7. The method of claim 1, wherein the physical characteristic is a density of material used to form the three-dimensional article and the watermark area has a different density than the second inner area.

8. The method of claim 1, wherein the physical characteristic is a crystallinity of material used to form the three-dimensional article and the watermark area has a different crystallinity than the second inner area.

9. The method of claim 1, wherein the second inner area has a first pattern and the watermark area has a second pattern different from the first pattern.

10. The method of claim 1, wherein the second inner area and the watermark area have identical patterns oriented in different directions.

11. A method of forming a three-dimensional article comprising:
forming a plurality of planar first two-dimensional layers, each of the plurality of planar first two-dimensional layers having a first outer edge defining a first boundary of the planar first two-dimensional layer and a first inner area within the first boundary defined by the first outer edge;

forming at least one planar second two-dimensional layer between two of the plurality of first two-dimensional layers, each at least one planar second two-dimensional layer having a second outer edge defining a second boundary of the planar second two-dimensional layer and a second inner area within the second boundary defined by the second outer edge, the second inner area having a generally uniform physical characteristic; and while forming the at least one planar second two-dimensional layer, forming a watermark area within the second inner area, the watermark area having a physical characteristic different from the generally uniform physical characteristic of the first inner area to define at least a portion of a watermark.

12. The method of claim 11, wherein the watermark is generally planar and a plane of the watermark is generally parallel to a plane of the plurality of planar first two-dimensional layers and the at least one planar second two-dimensional layer.

13. The method of claim 11, wherein the watermark is generally planar and a plane of the watermark is generally parallel perpendicular to a plane of the plurality of planar first two-dimensional layers and the at least one planar second two-dimensional layer.

* * * * *